Figure 1:
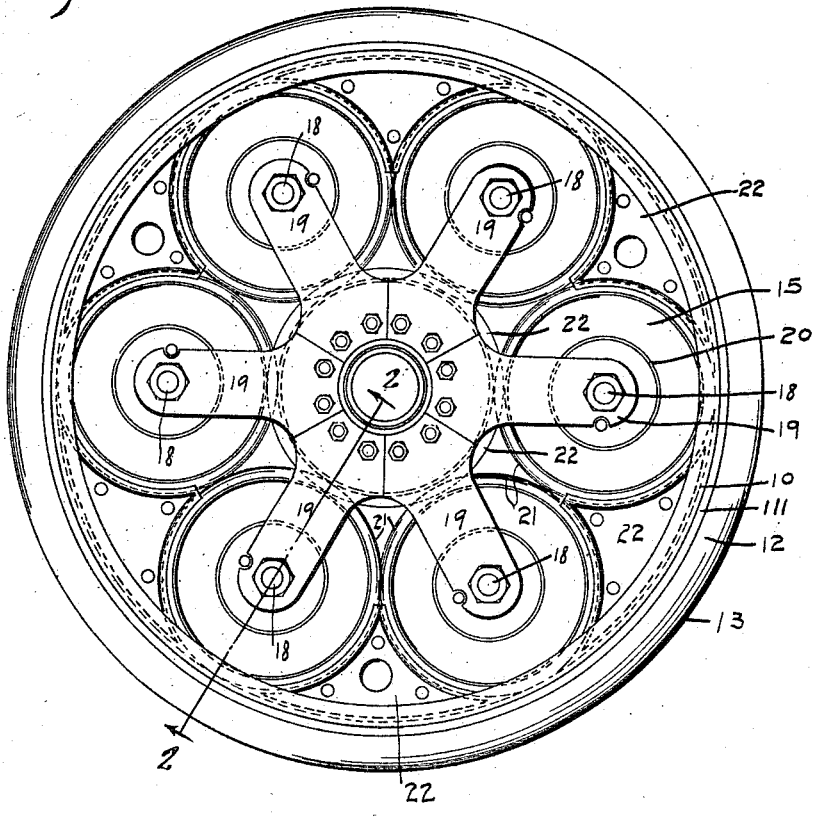

H. B. COATS.
VEHICLE WHEEL.
APPLICATION FILED FEB. 28, 1916.

1,284,241.

Patented Nov. 12, 1918.
2 SHEETS—SHEET 1.

WITNESSES:

INVENTOR
HENRY B COATS

BY

ATTORNEYS

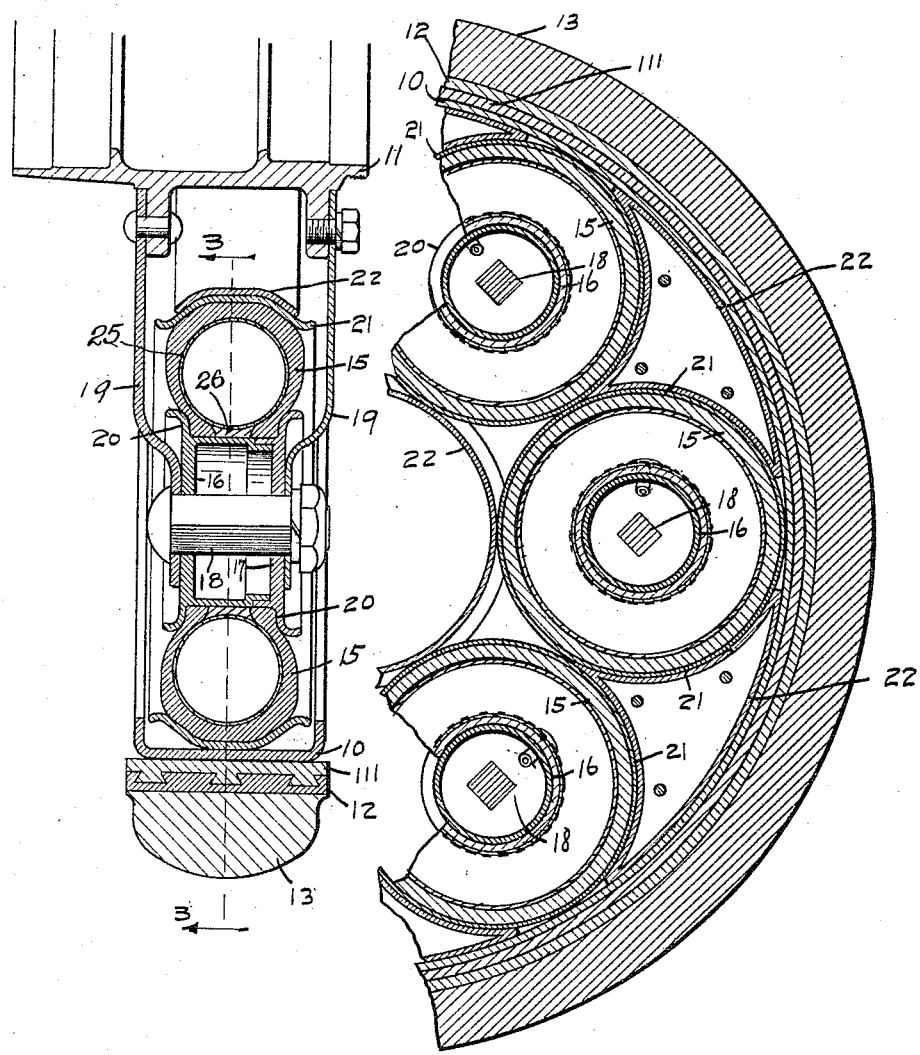

UNITED STATES PATENT OFFICE.

HENRY B. COATS, OF VEEDERSBURG, INDIANA.

VEHICLE-WHEEL.

1,284,241.  Specification of Letters Patent.  Patented Nov. 12, 1918.

Application filed February 28, 1916. Serial No. 80,943.

*To all whom it may concern:*

Be it known that I, HENRY B. COATS, a citizen of the United States, and a resident of Veedersburg, county of Fountain, and State of Indiana, have invented a certain new and useful Vehicle-Wheel; and I do hereby declare that the following is a full, clear, and exact description thereof, reference being had to the accompanying drawings, in which like numerals refer to like parts.

The object of this invention is to improve the construction and operation of vehicle wheels, particularly those adapted for automobiles, especially motor trucks, wherein there is a series of annular pneumatic cushions mounted between the hub and tire for yieldingly supporting said two wheel members in relation to each other. The rough and severe usage of motor truck wheels with their heavy loads, and with the rough streets having car tracks and other irregularities in the surface thereof, renders it difficult to make a pneumatically cushioned wheel so that it will stand the heavy work imposed upon it. To accomplish this is an object of the invention.

One feature of the invention consists in mounting the annular pneumatic cushions without any clenchers or clencher rims and without any recesses in the pneumatic cushion whereby the same is weakened or readily becomes weakened on account of the spreading of the sides of the cushion during use. As the invention is here shown, the sides of the cushion have ample room for spreading without interference by any flange or bead or other rigid surface. The rim flanges turn outwardly instead of inwardly and the outer and inner rim flanges are so far apart that they do not interfere with the lateral spreading of the cushion under weight.

The full nature of the invention will be understood from the accompanying drawings and the following description and claims:

In the drawings, Figure 1 is a side elevation of the wheel. Fig. 2 is a section on the line 2—2 of Fig. 1, on a larger scale. Fig. 3 is a section through a part of the wheel on the line 3—3 of Fig. 2.

There is shown herein an annular wheel rim 10 and a centrally located hub 11, said hub and the parts secured thereto floating within the wheel rim so that said rim or hub may yield radially with reference to the other under the influence of the load. The rim 10 has its periphery transversely flat and on the outer periphery of the rim there is an annular metal band 111 forced on under hydraulic pressure, as is now common in the art. A hard rubber band 12 surrounds the metal band and is secured thereto, and a soft rubber tire 13 is secured to and surrounds the hard rubber band.

Between the hub and rim there is a series of annular pneumatic cushions 15 mounted on and surrounding a cylindrical supporting member formed of the parts 16 and 17 which are held together by a bolt 18 between the radial arms 19 which extend from and are secured to the hub. Said inner member has peripheral and outwardly turning flanges 20 which, together with the periphery of said member, constitutes a holding means for the cushion. There is an annular outer cushion supporting member 21 which is secured to the rim 10 by the members 22. The lateral edges of the outer cushion supporting member 21 are turned outwardly and laterally like the flanges 20 of the inner supporting member. The flanges 20 and 21 are quite a distance apart so that there is ample room for the lateral extension of the cushion under a load without interference by said flanges. Heretofore such wheels have been provided with inner and outer clencher rims which were unyielding and projected inwardly into the cushions, in both the outer and inner peripheries, and they could only prevent the free lateral expansion of the cushion, but soon wore it or cut it out.

The pneumatic cushions are made up of the outer casing 15 and an inner tube 25 therein with an annular liner 26 surrounding the supporting members 16 and 17 and lying between the inner free edges of the outer casing 15. The inner tube is inflated by any well-known means which, however, is not here shown. The body of the bolt 18 is rectangular, as shown in Fig. 3, so that it cannot turn in the members through which it extends and will hold the members 16 and 17 on which the cushion is mounted from having any relative rotary movement.

The supporting member 16 is provided with a laterally extending sleeve member which projects from the member 16 to the member 17, the free end thereof being reduced in diameter to form a shoulder, while the member 17 has a flange which extends over the reduced portion of the sleeve of the member 16 and abuts against the shoulder thereon.

The arms 19 at one side of the wheel are fixed at their inner ends to the corresponding side of the hub 11, while the arms 19 on the other side of the wheel are removably secured to the corresponding side of the hub so that the parts of the wheel structure can be more readily assembled.

The invention claimed is:

1. The combination with a vehicle wheel having an outer rim, a hub, and a series of cushions for supporting the rim and hub with relation to each other, of independent arms extending from said hub, means to fix the arms on one side of the wheel to the corresponding side of the hub, means to removably secure the arms on the other side of the wheel to the corresponding side of the hub, a cylindrical cushion support between each pair of said arms, said arms and cushion support having registering rectangular openings therethrough, and a rectangular bolt extending through said arms and cushion supporting means.

2. The combination, in a vehicle wheel having an outer rim, a hub, a series of intermediate annular cushions for supporting the rim and hub in relation to each other, an outer cushion supporting member for each cushion, an inner cushion supporting member for each cushion comprising removable members adapted to be secured together, one of said members having a sleeve extending laterally to the other member, said sleeve having a portion of its free end reduced in diameter to form a shoulder, the other of said members having a flanged portion extending over said reduced portion and abutting the shoulder on the sleeve, arms extending from said hub to each side of said inner members, and a bolt extending through said arms and inner members for securing them rigidly together.

In witness whereof I have hereunto affixed my signature in the presence of the witnesses herein named.

HENRY B. COATS.

Witnesses:
NOAH M. TEEGARDEN,
FRANK W. HURLEY.

Copies of this patent may be obtained for five cents each, by addressing the "Commissioner of Patents, Washington, D. C."